Patented Aug. 20, 1946

2,405,994

UNITED STATES PATENT OFFICE 2,405,994

AVERAGING PROPANE AND PENTANE

Robert E. Burk, Cleveland Heights, Ohio, assignor to The Standard Oil Company, Cleveland, Ohio, a corporation of Ohio No Drawing. Application November 20, 1943, Serial No. 511,107

11 Claims. (Cl. 260—676)

This invention relates to the treatment of propane and pentane with a catalyst comprising primarily hydrogen fluoride and a minor proportion of boron trifluoride.

Propane and gases whose content is largely propane are quite common in the natural gas industry and in refineries. Propane is of too low a molecular weight for use as such in motor fuel and does not find a ready use except when liquefied for some special purposes, such as solvent treatment of lubricating stocks, etc. Furthermore, propane is relatively unreactive and does not readily enter into reactions which characterize the higher molecular weight hydrocarbons. It is therefore of low economic value.

It is an object of this invention to convert propane into higher molecular weight hydrocarbons which are useful as such, or which may be more readily reacted to valuable products.

A further object of the invention is to react propane in the presence of pentane to obtain substantial yields of butanes, which reaction is characterized as "averaging" the two reacting ingredients.

Still a further object of the invention is to carry out the above reactions in the presence of a catalyst comprising primarily hydrogen fluoride and a minor proportion of boron trifluoride.

An additional object of the invention is to react propane and pentane under conditions of temperature and pressure not lower or higher than can be obtained conveniently in plant operations.

The invention has as an object a process of the character described in which the activity of the catalyst can be readily controlled by means of the partial pressure of the boron trifluoride constituent of the catalyst, as well as by other means.

Still a further object is the provision of a process of reacting propane and pentane in which the catalyst can be readily recovered and reused.

Other objects of the invention will appear from the following description.

In carrying out the process of the invention, propane, as it is available from any convenient source or in the form of gases containing substantial proportions of propane, is mixed with pentane, preferably n-pentane, or a pentane containing fraction, and caused to react in the presence of a catalyst and under the conditions of temperature and pressure pointed out more particularly hereinafter.

The propane may be obtained from natural gas or from any refinery operation; it is immaterial if it contains small amounts of other constituents, and for this reason it need not be highly purified. It is also immaterial and in fact is an advantage as pointed out later, if the propane contains a small amount of propylene. For this reason it is not necessary to fractionate closely unsaturates and other ingredients from a propane containing fraction.

The pentane may be obtained from any refinery operation. Generally the pentane fraction will be mostly n-pentane because iso-pentane is a valuable material in itself and will generally have been separated from the pentane fraction. It is immaterial, however, if the pentane fraction contains iso-pentane or contains a small amount of other hydrocarbons or unsaturates. The latter may be beneficial as mentioned heretofore.

The catalyst used in the process comprises hydrogen fluoride promoted with a minor proportion of boron trifluoride therein, and in some instances with an olefin. It is used in the liquid phase.

Hydrogen fluoride boils at about 67° F. and is therefore a liquid at temperatures just under room temperature and may be kept liquid at higher temperatures by moderate pressures. The temperatures and pressures used in the process of the invention are conveniently those that maintain the hydrogen fluoride liquid. Boron trifluoride boils at −150° F. and is a gas at the temperatures and pressures conveniently employed in hydrocarbon treating processes. However, boron trifluoride dissolves in liquid hydrogen fluoride to a given extent and the amount which dissolves at any given temperature depends on the partial pressure of boron trifluoride. At higher partial pressures, larger amounts of boron trifluoride are dissolved. Thus the composition of the catalyst, i. e., the relative proportions of the two fluorides, may be regarded as a function of the amount of boron trifluoride dissolved in the hydrogen fluoride, which in turn is a function of the partial pressure of the boron trifluoride.

The amount of boron trifluoride dissolved in the hydrogen fluoride, at any given temperature, may be expressed conveniently in terms of the partial pressure of boron trifluoride. This may vary, in accordance with the invention, from 5 to 550 pounds per square inch; generally about 25 to 300 pounds per square inch will be used. However, the amount should under no circumstances exceed 50 mol per cent of the fluorides. With the partial pressures usually used the amount does not exceed 15 mol per cent. The words "dissolved" and "solution" are used as generic to both a physical admixture and a reaction product.

If an olefin is added, or is present in the propane or pentane stocks to be reacted, the olefin appears to act as a promoter. The available evidence indicates that the hydrogen fluoride-boron trifluoride solution or any reaction product may form a new compound or chemical complex which may be an ingredient of the catalyst.

The catalyst to be used in practicing the invention may be hydrogen fluoride promoted by a minor proportion of boron trifluoride; or it may be hydrogen fluoride promoted by both boron trifluoride and an olefin of any number of combinations. The presence of an olefin gives somewhat better results.

The hydrogen fluoride and boron trifluoride used may be the available commercial grades. It is not necessary to have chemically pure fluorides. The impurities in the commercial grades including water, which are generally present in an amount of not over about one per cent, do not interfere with the operation of the catalyst. In view of the economic advantage of using the commercial grade, it is preferred, and was used in the following examples.

The ingredients comprising the catalyst may be brought together in any order or simultaneously. Generally it is convenient to feed the two fluorides to the hydrocarbon reaction zone in admixture under the desired boron trifluoride partial pressure, although they may be introduced separately if desired. If an olefin is to be added as a promoter, this may be absorbed in the fluorides, or it may be fed to the reaction zone separately or along with any hydrocarbon materials being treated.

When an olefin is used in forming the catalyst it may vary from extremely small amounts to 100 or more mol per cent based on the amount of the boron trifluoride dissolved in the hydrogen fluoride. Expressed in practical terms, the amount of the olefin may be ½% to 25% based on the hydrocarbons being treated.

One of the advantages of the process of the invention is the ability to control the reaction by adjusting the activity of the catalyst through control of its composition. This may be accomplished by varying the partial pressure of the boron trifluoride inasmuch as a change in this partial pressure results in a change in the amount of boron trifluoride dissolved. This may also be accomplished by varying the amount of the olefin if one is used as a promoter.

Another advantage of the process is the fact that the hydrogen fluoride and boron trifluoride may be substantially completely recovered as such at the conclusion of the reaction, if desired, and can be reused.

Still another advantage of the process is the ability to carry out the operation in a liquid phase because the catalyst and the liquefied propane and pentane may be maintained in a liquid phase at appropriate temperatures and pressures. Inasmuch as the liquid catalyst is insoluble in the liquid hydrocarbon being treated, two phases may be separated at the end of the reaction and in this way the bulk of the catalyst may be separated by settling or by centrifuging. The catalyst phase is often referred to as the "lower layer," because it is heavier than the hydrocarbon phase. The fluorides comprised in the catalyst phase at the end of the reaction can be placed in the vapor phase and readily separated and recovered as such for reuse or they may be recovered by extraction, as will be described later.

The following examples, which are merely illustrative of the process, show the results that may be obtained in accordance with the invention.

Propane and pentane in the proportions of 60% by weight propane and 40% by weight pentane are introduced into a bomb provided with an agitator and treated with 100 volume per cent of liquid hydrogen fluoride (based on the liquid hydrocarbons) in which boron trifluoride was dissolved in an amount to provide a partial pressure of boron trifluoride of 150 lbs. per square inch. The reaction was carried out by mixing the hydrocarbon and the catalyst with agitation for a period of thirty minutes at a temperature of 190° F. The total pressure was 660 lbs. per square inch, which is necessary to maintain the propane liquid at this temperature.

The following table shows a comparison of the stock treated and the products obtained:

| Stock: | Weight per cent of charge |
|---|---|
| Propane | 60 |
| N-pentane | 40 |

| Product:[1] | |
|---|---|
| Ethane | 1.8 |
| Propane | 56.5 |
| Iso-butane | 18.0 |
| N-butane | 7.1 |
| Iso-pentane | 6.5 |
| N-pentane | 2.5 |
| C₆ and above | 5.2 |
| Hydrocarbon in lower layer | 2.4 |

[1] Yields corrected for gas in the bomb. Loss of several per cent prorated over entire yield.

In the practice of the process on a commercial basis the unreacted propane and pentane would be separated and recycled. The yield of the products based upon the propane and pentane which reacts are as follows:

| | Per cent |
|---|---|
| Ethane | 4.4 |
| Iso-butane | 44.0 |
| Normal butane | 17.3 |
| Iso-pentane | 15.9 |
| C₆ and above | 12.8 |
| Hydrocarbons in lower layer | 5.6 |

The reaction was duplicated using 59.5% by weight propane and 40.5% n-pentane in the charge and the reaction was carried out at a temperature of 170° F., otherwise the conditions are identical.

A comparison of the reacted stock and the products formed is as follows:

| Stock: | Weight per cent of charge |
|---|---|
| Propane | 59.5 |
| N-pentane | 40.5 |

| Product:[1] | |
|---|---|
| Ethane | 1.9 |
| Propane | 55.5 |
| Iso-butane | 19.2 |
| N-butane | 6.3 |
| Iso-pentane | 7.3 |
| N-pentane | 1.7 |
| C₆ and above | 6.5 |
| Hydrocarbon in lower layer | 1.6 |

[1] Yields corrected for gas in the bomb. Loss of several per cent prorated over entire yield.

If the unreacted n-pentane and propane are recycled, the products based on the material which reacts are as follows:

| | Per cent |
|---|---|
| Ethane | 4.4 |
| Iso-butane | 44.7 |
| N-butane | 14.8 |
| Iso-pentane | 17.1 |
| C₆ and above | 15.3 |
| Hydrocarbons in lower layer | 3.7 |

The results at the two temperatures are of as much the same order, the advantage being at the lower temperature, which results in a higher yield of iso-butane, iso-pentane, and a fraction boiling in the gasoline range, together with a smaller amount of hydrocarbon in the lower layer.

From the above results it will be seen that while the consumption of propane is not extra-ordinarily large, that which is consumed is converted into products of substantial value. In operations where pentane is to be treated to convert it to products of greater value, it is advantageous to treat the pentane in the presence of propane in accordance with the invention since all of the propane that may be converted to higher molecular weight hydrocarbons in the process may be viewed as a net economic gain.

The conditions under which the process is carried out are selected to produce the maximum yields. In general, the temperature may vary from 0° to 250° F., preferably about 50° to 200° F. It is an advantage of the process that extreme temperatures in either direction are not needed.

The amount of the liquid catalyst used may vary, depending upon other conditions, and may be from 1 to 300 volume per cent based on the propane and pentane to be treated when in liquid form; preferably 5 to 100 volume per cent of the catalyst is employed. The total pressure may vary up to 1000 pounds per square inch. It must exceed the partial pressure of the boron trifluoride, due to the relatively high partial pressure of propane required to keep the propane in liquid form during the reaction. The total pressure should be sufficient to keep the catalyst in the liquid phase and preferably the hydrocarbons in the liquid phase at the temperature employed.

The amount of boron trifluoride as expressed in terms of partial pressure, and of olefin, if one is used, has been indicated heretofore in describing a composition of the catalyst.

The time of contact between the hydrocarbon and the catalyst may vary with the temperature, thoroughness of contact between the hydrocarbon and the catalyst, and other factors, and depending upon such other factors the time should be selected to give optimum yields. This will be from a few minutes to several hours. With the thoroughness of mixing possible with commercial mixers, the time may be reduced materially below that indicated in the example. Commercial considerations indicate the time necessary should be the minimum to permit the reaction to go to the desired extent under the other operating conditions.

The temperature, composition of the catalyst, time of contact, and other factors mentioned heretofore are more or less interdependent. The ranges described heretofore are not intended to mean that any temperature may be used with any length of time or any composition of catalyst to obtain the identical result. The temperature selected generally will be with reference to the desired equilibrium point in the averaging reaction. If a lower temperature is used, a somewhat larger amount of catalyst may be present or a somewhat higher partial pressure of boron trifluoride may be used, or the treating time may be longer, or any or all of them, to obtain about the same activity that would be obtained with a higher temperature and with a lesser amount of catalyst, or a lower partial pressure of boron trifluoride, or with a shorter treating time. Thus for almost any temperature selected, a given activity of the catalyst may be obtained by adjusting other variables, or for a given treating time a given activity can be obtained by varying the other variables. It is a particularly important part of the process that in addition to varying the time of contact, the amount of catalyst and the temperature, which are the variables with which the prior art has had to work, it is possible, in accordance with the process to vary the composition of the catalyst by varying the partial pressure of the boron fluoride. Thus, for any given temperature, time of contact, etc., at which it is desirable to operate because of plant equipment or economic reasons, the rate of the reaction and the activity for the catalyst can be varied simply by adjusting the partial pressure of the boron trifluoride.

The proportions of propane to pentane may be varied over a relatively wide range, depending upon the availability of these materials. The advantage of using propane with pentane as compared with treating pentane alone, would indicate that at least about 40% propane should be used to make the improved results economically worthwhile. While lesser proportions give correspondingly less advantage, they may be used if it were found economical. The upper limit to the amount of propane is probably quite high and experiments indicate that even a few per cent pentane are an advantage over treating propane alone with the same catalyst.

The process may also be carried out in the presence of hydrogen, which may be introduced into the reaction in an amount to provide a partial pressure of hydrogen of 50 to 2000 pounds per square inch. This tends to minimize the amount of hydrocarbons entering the lower layer, but inasmuch as this is not a serious loss in averaging pentane and propane in accordance with the invention, the advantages to be gained by using hydrogen may not be such as to require it.

The process is adapted either for batch operation or for continuous operation. In the case of batch operation, propane and pentane and the fluorides are brought together in any order in the desired amounts into a closed container or autoclave where they are preferably subjected to agitation and maintained under the desired temperature and pressure conditions for the required length of time. If an olefin is to be used as a promoter, this may be contained in either the propane or pentane stock, or it may be introduced separately or absorbed in the fluorides. If hydrogen is to be used this may be introduced from a separate high pressure source of supply. Following the treating operation the materials will stratify when permitted to come to a quiescent state and may be separated. If desired, forces greater than gravity, such as centrifuging, may be used to effect the separation. The lighter or upper layer will contain the hydrocarbons and the lower layer will comprise the catalyst. If the pressure is released, the propane, boron trifluoride (and hydrogen if it is used) may be sent to storage for reuse later. If the temperature is higher than 67° F. at least a part of the hydrogen fluoride also will be released and may be condensed or retained in the gaseous state for reuse. However, the separation may be made under pressure and all of the ingredients, except the liquid hydrocarbon layer to be removed, may be retained in the autoclave.

In a continuous process, the fluorides and hydrocarbons to be treated (and olefin and/or hydrogen if used) are fed into a continuous type mixer, for example a 3-stage mixer, maintained at the desired temperature and under the appropriate pressure. The rate of flow through the mixer is adjusted so that the hydrocarbons are in contact with the catalyst for the desired length of time. The mixture may be fed into a separator where it is permitted to stratify. The upper layer containing the hydrocarbons formed in the process may be continuously withdrawn and fractionated. The unreacted propane, or propane and pentane, or any other products may be recycled to the mixer. It is not necessary to separate the fluorides that may be dissolved in the material to be recycled. The wanted products may have any remaining fluorides removed by distillation and/or by treatment with basic, attractive, or other compounds reactive therewith to form materials not soluble in hydrocarbons.

The lower layer comprising the catalyst phase may be recirculated to the mixing zone and may be reused for treating a separate amount of propane and pentane or for reuse in other processes.

If an olefin is introduced by way of a separate supply it need be added only at the start of the process and the fluorides-olefin catalyst may be recirculated and reused with fresh supplies of the hydrocarbons to be treated. If an olefin is admitted wtih the hydrocarbon to be treated or the operation otherwise is such that the amount of hydrocarbons gradually builds up in the catalyst phase, it may be desirable to withdraw a portion or all of the catalyst phase and subject it to a relatively high temperature, for example 250–600° F. This may be by way of a pot still, or by means of flash distillation. At this temperature substantially all of the fluorides are liberated as gases. These can be collected and condensed and/or compressed and returned to the mixing zone or stored or otherwise used.

Alternatively, instead of distilling the fluorides, the lower layer or catalyst phase may be treated with a material which exerts a solvent action on the fluorides and which is immiscible with the hydrocarbons in the lower layer, or which forms a chemical compound or complex with the fluorides, and from which the fluorides may be released later, for example by heating. Such a material may be dihydroxyfluoboric acid. Another alternative is to distill off a part or most of the fluorides from the lower layer at a relatively lower temperature and remove the rest of the fluorides by extraction with such a material. The hydrocarbons in the upper layer also can be treated with such a material to extract fluorides therefrom if this is desired.

Since the propane and pentane stocks ordinarily will not contain aromatics, the catalyst will not become degraded as a result of forming a complex with aromatics. The catalyst therefore is particularly desirable for use in the averaging of pentane and propane with a minimum of regeneration by any of the processes above mentioned.

In the above described process, especially the continuous process, it will be seen that for a given temperature, amount of liquid catalyst phase, and rate of flow through the mixer, the rate of the reaction can be controlled by varying the composition of the catalyst. This in effect can be varied by adjusting the partial pressure of the boron trifluoride. To lower the pressure it is necessary only to open a valve in the mixer and boron trifluoride will be released and can be sent to storage. To increase the pressure, boron trifluoride from a high pressure storage supply can be admitted to the mixing stage. This adjustment is made to produce the highest yields of the wanted products.

My invention is capable of many applications and embodiments as will be apparent to one skilled in the art in view of the disclosure herein, and all are to be included as are within the scope of my claims.

I claim:

1. A process of catalytically treating hydrocarbons, which comprises treating propane and pentane with a liquid catalyst comprising liquid hydrogen fluoride in which is dissolved not over 50 mol per cent of boron trifluoride (based on the fluorides) to provide a partial pressure of boron trifluoride of 5 to 550 pounds per square inch, and regulating the activity of the catalyst with reference to the conditions of the reaction by adjusting the partial pressure of the boron trifluoride to produce hydrocarbons having a boiling point intermediate said propane and pentane.

2. A process of catalytically treating hydrocarbons which comprises treating propane and pentane in the presence of a small amount of an olefin, with a liquid catalyst comprising liquid hydrogen fluoride in which is dissolved not over 50 mol per cent of boron trifluoride (based on the fluorides) to provide a partial pressure of boron trifluoride of 5 to 550 pounds per square inch, and regulating the activity of the catalyst with reference to the conditions of the reaction by adjusting the partial pressure of the boron trifluoride to produce hydrocarbons having a boiling point intermediate said propane and pentane.

3. A process of catalytically treating hydrocarbons, which comprises treating propane and pentane with a liquid catalyst comprising liquid hydrogen fluoride in which is dissolved not over 50 mol per cent of boron trifluoride (based on the fluorides) to provide a partial pressure of boron trifluoride of 5 to 550 pounds per square inch, and regulating the activity of the catalyst with reference to the conditions of the reaction by adjusting the partial pressure of the boron trifluoride to produce hydrocarbons having a boiling point intermediate said propane and pentane, separating the hydrocarbons from the liquid catalyst phase, separating the formed hydrocarbons from the reacting hydrocarbons, and recycling at least part of the reacting hydrocarbons to the reaction zone.

4. A process of catalytically treating hydrocarbons, which comprises treating propane and pentane as the primary reacting ingredients with 1 to 300 volume per cent (based on the liquid hydrocarbons) of a liquid catalyst comprising liquid hydrogen fluoride in which is dissolved not over 50 mol per cent of boron trifluoride (based on the fluorides) to provide a partial pressure of boron trifluoride of 5 to 550 pounds per square inch, continuing the reaction at a temperature of from 0° to 250° F. under a total pressure to maintain the hydrogen fluoride liquid at the temperature employed, and regulating the activity of the catalyst with reference to the conditions of the reaction by adjusting the partial pressure of the boron trifluoride to produce hydrocarbons having a boiling point intermediate said propane and pentane.

5. A process of catalytically treating hydrocarbons, which comprises treating propane and pentane with 1 to 300 volume per cent (based on the liquid hydrocarbons) of a liquid catalyst comprising liquid hydrogen fluoride in which is dissolved not over 50 mol per cent of boron trifluoride (based on the fluorides) to provide a partial pressure of boron trifluoride of 5 to 550 pounds per square inch, continuing the reaction at a temperature of from 0° to 250° F. under a total pressure to maintain the hydrogen fluoride and the hydrocarbons liquid at the temperature employed, and regulating the activity of the catalyst with reference to the conditions of the reaction by adjusting the partial pressure of the boron trifluoride to produce hydrocarbons having a boiling point intermediate said propane and pentane, separating the hydrocarbon phase from the liquid catalyst phase, and separating the formed hydrocarbons from the hydrocarbon phase.

6. A process of catalytically treating hydrocarbons, which comprises treating propane and pentane with 1 to 300 volume per cent (based on the liquid hydrocarbons) of a liquid catalyst comprising liquid hydrogen fluoride in which is dissolved not over 50 mol per cent of boron trifluoride (based on the fluorides) to provide a partial pressure of boron trifluoride of 5 to 550 pounds per square inch, continuing the reaction at a temperature of from 0° to 250° F. under a total pressure to maintain the hydrogen fluoride and the hydrocarbons liquid at the temperature employed, and regulating the activity of the catalyst with reference to the conditions of the reaction by adjusting the partial pressure of the boron trifluoride to produce hydrocarbons having a boiling point intermediate said propane and pentane, separating the hydrocarbon phase from the liquid catalyst phase, separating fluorides from the catalyst phase and returning them to the reaction zone.

7. A process of catalytically treating hydrocarbons, which comprises treating 40% to 95% propane and the balance substantially pentane with 1 to 300 volume per cent (based on the liquid hydrocarbons) of a liquid catalyst comprising liquid hydrogen fluoride in which is dissolved not over 50 mol per cent of boron trifluoride (based on the fluorides) to provide a partial pressure of boron trifluoride of 5 to 550 pounds per square inch, continuing the reaction at a temperature of from 0° to 250° F. from a few minutes to several hours under a total pressure to maintain the hydrogen fluoride and the hydrocarbons liquid at the temperature employed, and regulating the activity of the catalyst with reference to the conditions of the reaction by adjusting the partial pressure of the boron trifluoride to produce hydrocarbons having a boiling point intermediate said propane and pentane, and separating the hydrocarbon phase from the liquid catalyst phase.

8. A process of catalytically treating hydrocarbons, which comprises treating 40% to 95% propane and the balance substantially pentane with 1 to 300 volume per cent (based on the liquid hydrocarbons) of a liquid catalyst comprising liquid hydrogen fluoride in which is dissolved not over 50 mol per cent of boron trifluoride (based on the fluorides) to provide a partial pressure of boron trifluoride of 5 to 550 pounds per square inch, continuing the reaction at a temperature of from 0° to 250° F. from a few minutes to several hours under a total pressure to maintain the hydrogen fluoride and the hydrocarbons liquid at the temperature employed, and regulating the activity of the catalyst with reference to the conditions of the reaction by adjusting the partial pressure of the boron trifluoride to produce hydrocarbons having a boiling point intermediate said propane and pentane, separating the hydrocarbon phase from the liquid catalyst phase, separating the formed hydrocarbons from the reacting hydrocarbons and recycling at least part of the reacting hydrocarbons to the reaction zone.

9. A process of catalytically treating hydrocarbons, which comprises treating 40% to 95% propane and the balance substantially pentane with 1 to 300 volume per cent (based on the liquid hydrocarbons) of a liquid catalyst comprising liquid hydrogen fluoride in which is dissolved not over 50 mol per cent of boron trifluoride (based on the fluorides) to provide a partial pressure of boron trifluoride of 5 to 550 pounds per square inch, continuing the reaction at a temperature of from 0° to 250° F. from a few minutes to several hours under a total pressure to maintain the hydrogen fluoride and the hydrocarbons liquid at the temperature employed, and regulating the activity of the catalyst with reference to the conditions of the reaction by adjusting the partial pressure of the boron trifluoride to produce hydrocarbons having a boiling point intermediate said propane and pentane, separating the hydrocarbon phase from the liquid catalyst phase, separating fluorides from the catalyst phase and return at least part to the reaction zone, separating the formed hydrocarbons from the reacting hydrocarbons and recycling at least part of the reacting hydrocarbons to the reaction zone.

10. A process of catalytically treating hydrocarbons, which comprises treating 40% to 95% propane and the balance substantially pentane, in the presence of a small amount of an olefin, with 1 to 300 volume per cent (based on the liquid hydrocarbons) of a liquid catalyst comprising liquid hydrogen fluoride in which is dissolved not over 50 mol per cent of boron trifluoride (based on the fluorides) to provide a partial pressure of boron trifluoride of 5 to 550 pounds per square inch, continuing the reaction at a temperature of from 0° to 250° F. from a few minutes to several hours under a total pressure to maintain the hydrogen fluoride and the hydrocarbons liquid at the temperature employed, and regulating the activity of the catalyst with reference to the conditions of the reaction by adjusting the partial pressure of the boron trifluoride to produce hydrocarbons having a boiling point intermediate said propane and pentane, separating the hydrocarbons from the liquid catalyst phase, recycling at least a part of the catalyst phase to the reaction zone, separating the formed hydrocarbon from the reacting hydrocarbons and recycling at least part of the reacting hydrocarbons to the reaction zone.

11. A process of catalytically treating hydrocarbons, which comprises treating 40% to 95% propane and the balance substantially pentane, in the presence of a small amount of an olefin and an amount of hydrogen to provide a partial pressure of 50 to 2000 pounds per square inch, with 1 to 300 volume per cent (based on the liquid hydrocarbons) of a liquid catalyst comprising liquid hydrogen fluoride not containing more water than in a commercial grade, in which hydrogen fluoride is dissolved not over 50 mol per cent of boron trifluoride (based on the fluorides) to provide a partial pressure of boron trifluoride of 5 to 550 pounds per square inch, continuing the reaction at a temperature of from 0° to 250° F. from a few minutes to several hours under a total pressure to maintain the hydrogen fluoride and the hydrocarbons liquid at the temperature employed, and regulating the activity of the catalyst with reference to the conditions of the reaction recited by adjusting the partial pressure of the boron trifluoride to produce hydrocarbons having a boiling point intermediate said propane and pentane, separating the hydrocarbons from the liquid catalyst phase, recycling at least a part of the catalyst phase to the reaction zone, separating the formed hydrocarbons from the reacting hydrocarbons and recycling at least part of the reacting hydrocarbons to the reaction zone.

ROBERT E. BURK.